Oct. 16, 1956 H. A. STEIGER 2,766,744
TURBO-COOLING MEANS FOR NON-SUPERCHARGED DUAL-FUEL
TWO-CYCLE INTERNAL COMBUSTION ENGINES
Filed March 18, 1952

INVENTOR.
HEINRICH A. STEIGER.
BY
K. A. Mayr
ATTORNEY.

United States Patent Office 2,766,744
Patented Oct. 16, 1956

2,766,744

TURBO-COOLING MEANS FOR NON-SUPER-CHARGED DUAL-FUEL TWO-CYCLE INTERNAL COMBUSTION ENGINES

Heinrich A. Steiger, State College, Pa.

Application March 18, 1952, Serial No. 277,096

2 Claims. (Cl. 123—65)

The present invention relates to a turbo-cooling means for non-supercharged dual-fuel two-cycle internal combustion engines.

Two-cycle internal combustion engines of the gas and of the dual-fuel type in particular are severely limited in their output by knock phenomena. The term "dual-fuel engine" designates an internal combustion engine which can be selectively operated as a diesel engine, i. e. by means of diesel fuel which is ignited by compression, or, at least for a portion of the fuel, as Otto engine without changing the compression ratio or other alterations, the portion of the fuel being in gas state and mixed with combustion air before or at the beginning of the compression and ignited either by a compression-ignited other portion of the fuel which consists of diesel fuel or by means of a spark plug, hot bulb, or the like.

It is an object of the present invention to provide a turbo-cooling means for non-supercharged dual-fuel two-cycle internal combustion engines by which knocking is considerably reduced, i. e. occurs at a much higher critical load than in conventional systems. The means according to the invention are much simpler, involve fewer operating difficulties, and are less expensive than the means hitherto employed for this purpose, such as mixing chemical knock-inhibitors with the fuel, increasing the amount of combustion air in relation to the amount of fuel, decreasing the compression temperature by injecting water into the fuel, or using a refrigeration plant for cooling the air supplied to the engine. The system according to the invention is at least as effective as the use of a refrigeration plant, but is without its disadvantages caused by high cost, complicated machinery, and servicing problems for example leakage of refrigeration fluid into the scavenging air.

The system according to the invention can be attached to conventional two-cycle internal combustion engines having a blower of the positive displacement type for compressing the scavenging air, which is either driven by the engine or by an auxiliary power source. No changes need be made, and the new system can readily be applied to existing engines, even in the field. With the new system, a portion or all of the compressed air is by-passed through a cooler, further compressed, cooled again, and cooled by expansion, preferably in an air turbine driving the additional compressor, to a temperature of, say, 32° F., before it is supplied to the scavenging air receiver of the engine.

It is a further object of the invention to provide a compact turbo-compressor unit in which the air compressed in the compressor of the unit is expanded in the turbine of the unit and supplies the power for operating the compressor.

Further and other objects of the present invention will be hereinafter set forth in the accompanying specification and claims, and shown in the drawings, which, by way of illustration, show what I now consider to be a preferred embodiment of my invention.

Figure 1:
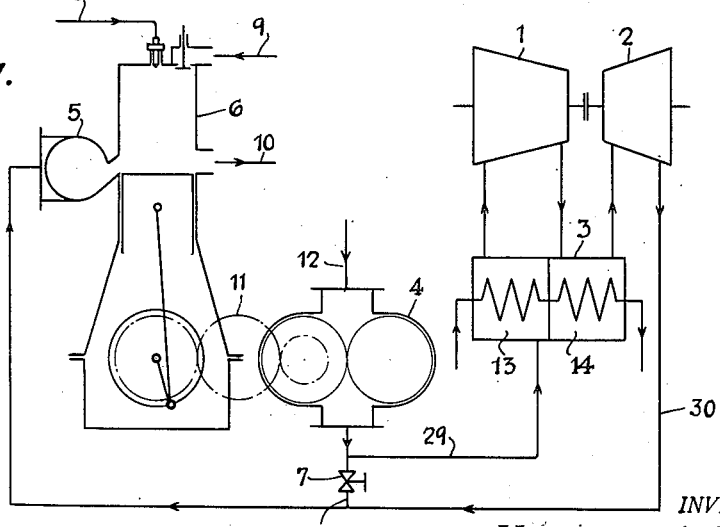
Fig. 1 is a diagrammatic illustration of the system according to the invention.

Referring more particularly to Fig. 1 of the drawing, numeral 1 designates a radial compressor coupled directly to an expander 2 and a two-stage air-to-water heat exchanger 3. The inlet of the "turbo-cooler" is connected through conduit 29 to the outlet of the scavenging blower 4 and its outlet to the scavenging receiver 5 of the internal combustion engine 6 by means of conduit 30. Inlet and outlet of the turbo-cooler are shunted by a conduit 31 in which a manually or automatically controlled gate-valve 7 is inserted for determining the extent of cooling most suitable for a given condition. The internal combustion engine with its fuel line 8, gas line 9, exhaust 10, and gear train 11 for the blower 4, requires no alteration of any sort, save for the line connections to and from the turbo-cooler. If the engine is operated as a diesel engine, diesel fuel is injected through the conduit 8, and if the engine is operated as an Otto engine, gas or vaporized fuel is supplied through the conduit 9. In the latter case, ignition is effected by simultaneously injecting diesel fuel through the conduit 8 and igniting it by compression.

The functioning of the system with the by-pass 7 fully closed for maximum cooling may be explained as follows: The scavenging air enters the blower 4 at 12 with approximately ambient pressure and temperature. The blower compresses the air to about 7.5 p. s. i. g. instead of to about 3 p. s. i. g. as is common for a larger size engine. Consequently, the temperature rise of the air will be appreciable, and it is advisable to cool it down in the first stage 13 of the cooler 3 before it enters the radial compressor 1. This compressor, which is driven by the expander 2, compresses the air still further, say, to about 15.7 p. s. i. g., whereupon it is cooled down again in the second stage 14 of the cooler 3 to approximately 100° F. In the expander 2, the pressure drops from 15.7 p. s. i. g. to 3 p. s. i. g. and the temperature from 100° F. to 32° F., thereby generating sufficient mechanical energy to propel the compressor 1 and to overcome the combined losses of the group.

The extra energy required to do the cooling job appears in the form of an increase in the compression ratio of the blower 4, and it amounts to about 65 percent of the standard blower input or to 7.65 B. t. u. per lb. of air, which is well within the range of the power requirements for conventional refrigeration plants. The benefits of the cooling are represented by a 100° to 120° F. drop in compression temperature, a 7 percent increase in the weight of the effective cylinder charge and a 10 percent reduction in the cooling losses to the jacket water (for the same average cylinder wall temperature), hence by an increased combustion efficiency.

It is obvious that the increase in the weight of the cylinder charge due to the reduced air temperature does not increase the output of the plant because the engine torque must be correspondingly increased to provide the power required by the refrigeration system. The present invention relates exclusively to the relationship between the occurrence of the knock-phenomena and the temperature of the compressed combustion air in internal combustion engines operating on the Otto-cycle. Only in such engines it is possible to obtain an increase of the mean effective pressure by 20 to 30% because of the aforesaid relationship without increasing the intake manifold pressure.

Figure 2:
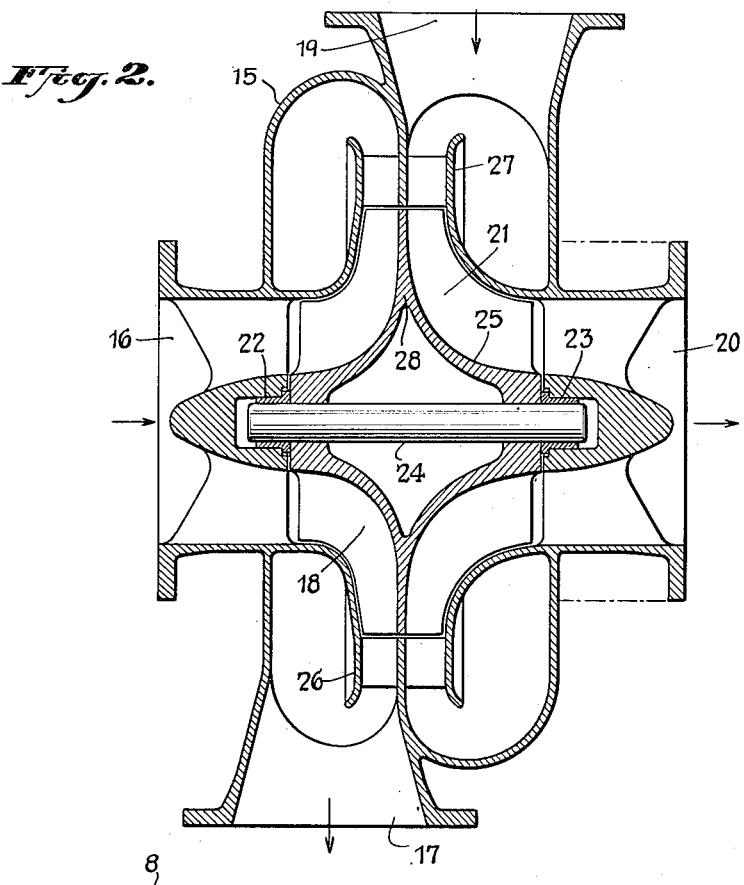
Fig. 2 is a longitudinal sectional view of a compressor-expander unit according to the invention.

Fig. 2 illustrates an economical design of the turbo-cooler unit 1, 2. It consists of a housing 15 having an inlet 16 and an outlet 17 for a centrifugal compressor 18, an inlet 19 and outlet 20 for a centripetal expander 21, and supports for bearings 22 and 23. A shaft 24 together with the one-piece impeller 25 rotates freely in those bearings. The unit is completed by a diffuser ring 26 for the compressor and a nozzle ring 27 for the expander. The blades of the compressor, as well as the blades of the expander, are mounted on a common disc member 28.

While I believe the above described embodiment of my invention to be a preferred embodiment, I wish it to be understood that I do not desire to be limited to the exact details of design and construction shown and described, for obvious modifications will occur to a person skilled in the art.

I claim:

1. A two-cycle internal combustion engine comprising, in combination, means for injecting diesel fuel and means for supplying a mixture of combustion air and gaseous fuel for selectively operating the engine as a diesel engine, as an Otto engine or as a combined diesel and Otto engine; a first air compressor driven by said engine and receiving the air from the atmosphere; a first intercooler receiving the compressed air from said first compressor through a first conduit; a second air compressor driven by an air turbine and receiving the compressed and cooled air from said first intercooler and compressing the air still further; a second intercooler receiving the compressed air from said second air compressor; said air turbine receiving the compressed and cooled air from said second intercooler and cooling the air still further by expanding it; and a scavenging air receiver for said engine receiving the cooled air from said air turbine through a second conduit.

2. An internal combustion engine as defined in claim 1, said second compressor and said turbine having a common rotor, said rotor comprising a single disc means extending at a right angle to the rotation axis of the rotor, blading extending from one surface of said disc means for centrifugal compression of the air, and blading extending from the other surface of said disc means for centripetal expansion of the air.

References Cited in the file of this patent

UNITED STATES PATENTS

| | | |
|---|---|---|
| 2,491,461 | Wood | Dec. 13, 1949 |
| 2,526,103 | Wood | Oct. 17, 1950 |
| 2,585,570 | Messinger | Feb. 12, 1952 |
| 2,686,503 | Reddy et al. | Aug. 17, 1954 |

FOREIGN PATENTS

| | | |
|---|---|---|
| 601,965 | France | Dec. 16, 1925 |